United States Patent
Underhill

(10) Patent No.: US 6,758,028 B1
(45) Date of Patent: Jul. 6, 2004

(54) FINISHING WRAPPER FOR CROP BALES

(75) Inventor: Kenneth R. Underhill, Strasburg, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/426,297

(22) Filed: Apr. 30, 2003

(51) Int. Cl.[7] .............................................. B65B 11/04
(52) U.S. Cl. .............................. 53/587; 53/556; 53/211; 53/118
(58) Field of Search ............................ 53/587, 556, 211, 53/118

(56) References Cited

U.S. PATENT DOCUMENTS

| | | | |
|---|---|---|---|
| 5,230,193 A | 7/1993 | Underhill et al. | 53/556 |
| 5,483,785 A | 1/1996 | DiCarlo | 53/556 |
| 5,660,023 A * | 8/1997 | Kivela | 53/587 |
| 5,740,662 A | 4/1998 | Royneberg et al. | 53/556 |
| 5,799,466 A | 9/1998 | Underhill | 53/399 |
| 5,822,967 A | 10/1998 | Hood et al. | 56/341 |
| 6,341,470 B1 | 1/2002 | Lacey | 53/176 |
| 6,405,510 B1 | 6/2002 | Viaud | 53/118 |
| 6,457,295 B1 * | 10/2002 | Arnold | 53/211 |
| 6,467,237 B2 * | 10/2002 | Viaud | 53/118 |

* cited by examiner

*Primary Examiner*—Stephen F. Gerrity
(74) *Attorney, Agent, or Firm*—John Williams Stader; Collin A. Webb

(57) ABSTRACT

The apparatus is a rear extension on a conventional round baler that already produces round bales partially wrapped with plastic around only their cylindrical surface. The additional structure includes a table to receive the bale and rotate the bale so that the unwrapped surfaces face forward and back, after which pivoting arms aligned with the sides of the baler clamp the bale, lift it off the table, and rotate it end over end to continue the wrapping process around the previously uncovered ends. When the bale is completely wrapped, the baler's knife cuts the plastic sheet, and the arms continue pivoting rearward before releasing the bale onto the ground.

6 Claims, 3 Drawing Sheets

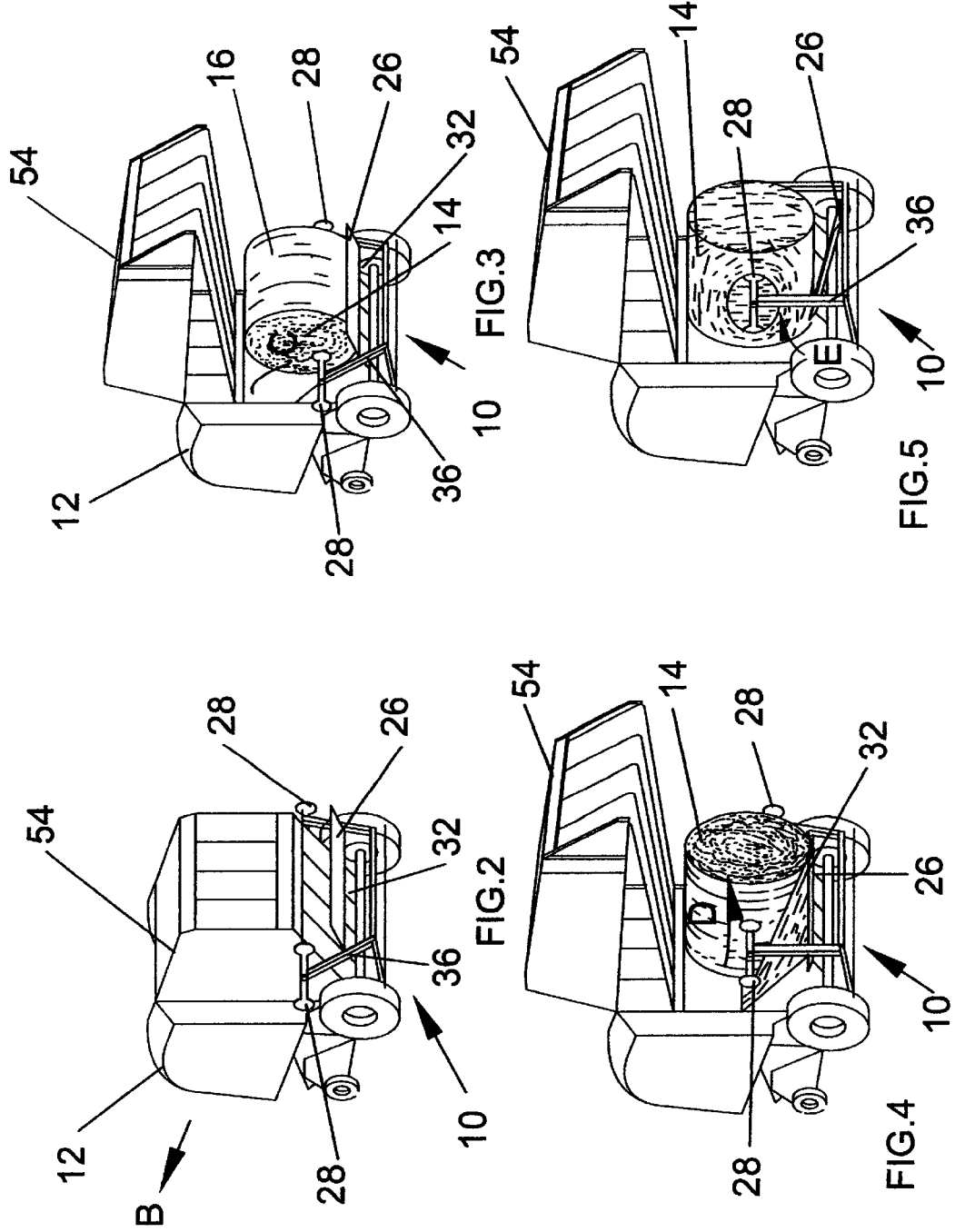

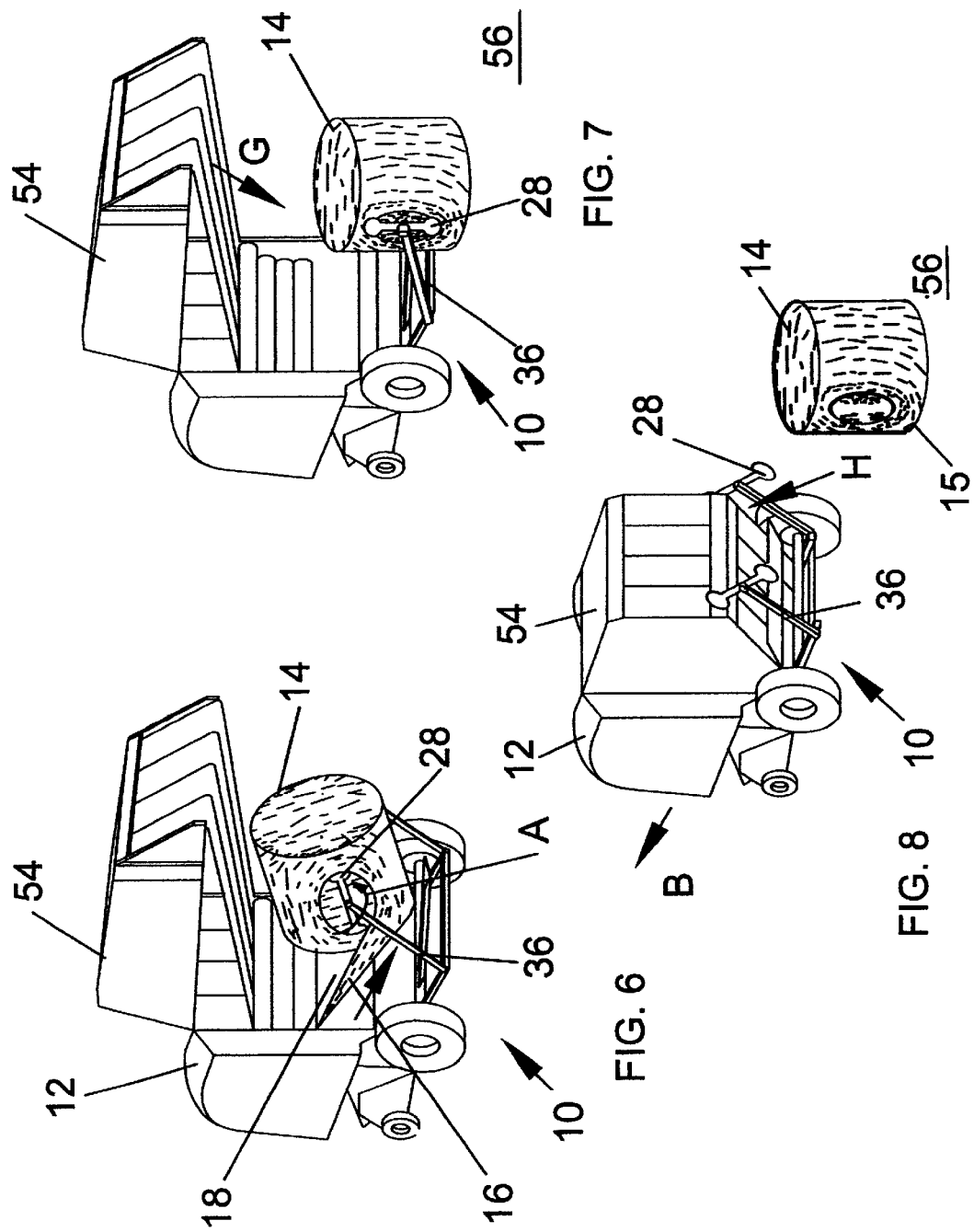

FINISHING WRAPPER FOR CROP BALES

BACKGROUND OF THE INVENTION

This invention deals generally with agricultural equipment and more specifically with an apparatus to complete the wrapping of a partially wrapped bale produced by a "round baler".

Round balers with the capability of wrapping the bales in plastic film have become common machines on the agricultural landscape. The benefits of the wrapped bales are that they protect the crop material from the weather, encourage crops to ferment to enhance the nutritional value, and eliminate the need for costly storage facilities. Some machines in the prior art are built to pick up formed round bales from the fields, wrap them, and then put them back down, but such an approach requires significant manpower and machinery. Other machines can be pulled behind a round baler, accept the bale from the baler and wrap it as the baler forms the next bale.

However, there are several round balers that take advantage of the action of the baler itself, the rotation of a cylinder of crop material, to wrap the cylinder by inserting plastic film from a supply roll into the bale forming chamber. This allows the bale rotation in the forming chamber to catch the plastic film and wrap it around the bale's cylindrical surface. A particular example of this type of round baler is disclosed in U.S. Pat. No. 5,230,193 by Underhill et al. With such a wrapper, it is possible to furnish excess wrapping material extending off the non-cylindrical ends of cylindrical bales for later use in sealing the ends.

One approach in the prior art has been to build machines that rotate the bale around its axis to wrap the cylindrical surface and to sequentially or simultaneously rotate the bale in a horizontal plane to wrap the ends of the bale. Another approach has been to use a so called satellite system in which the bale is rotated around its axis to cover the cylindrical surface, and the ends of the cylindrical bale are wrapped by a supply roller that moves around the bale in a horizontal plane.

The problem with such machines are their great complexity. Almost all of them operate independently of the baler itself, even if they are towed behind the baler. Furthermore, they all must produce a duplicate motion that the baler has just completed, the rotation of the cylindrical bale around its cylindrical axis.

It would be very beneficial to have a simple machine that merely wraps the ends of a bale, the cylindrical surface of which was already wrapped by a round baler, and to include that machine right on the frame of the round baler, so that it could be operated by the baler operator and even use the same continuous film material that covers the cylindrical surface.

SUMMARY OF THE INVENTION

The present invention is a finishing wrapper structure added to the rear of a prior art round baler to complete the wrapping of a bale that has only its cylindrical surface wrapped with plastic film. The finishing wrapper of the invention is constructed on a base frame that is essentially a pivoting rearward extension of the frame of the round baler, and the finishing wrapper receives the ejected partially wrapped bale while the plastic film on the bale is still attached to the supply roll of the film that is in the baler. The bale is captured by a slightly "V" shaped table that prevents the bale from rolling off the back of the finishing wrapper because the table is oriented with its higher sides aligned transverse to the direction of motion of the baler and parallel to the axis of the ejected bale. The table is then rotated 90 degrees to reorient the bale with its cylindrical axis aligned with the baler's direction of motion.

Two clamping arms are attached to the base frame of the finishing wrapper, with one arm on each side of the base frame at a location approximately aligned with the sides of the baler and on opposite sides of the reoriented bale. Each clamping arm is pivotable and has a rotating clamp on its end remote from the base frame, with the rotating clamps formed essentially as short beams with paddle like ends that angle slightly inward toward the bale. The rotational motion of each clamp is powered by a hydraulic motor mounted on the clamping arm near the rotating clamp and is transferred to the rotating clamp by a conventional chain drive.

The clamping arms themselves can pivot both toward each other to clamp tightly onto the bale and in an arc toward the rear of the finishing wrapper to release a bale on the ground behind the apparatus. The pivoting action of the clamping arms and the rotation of the "V" shaped table are all conventionally powered by hydraulic cylinders.

The actions of the finishing wrapper are surprisingly straightforward. When the tailgate of the conventional baler opens, instead of the bale being ejected onto the ground and the plastic film that is wrapped around its cylindrical surface being cut free from the supply roll, the bale is caught by the "V" shaped table of the finishing wrapper. Furthermore, the plastic film is not cut, but trails out of the baler and stays on the bale. Then the table is rotated 90 degrees so that the unwrapped ends of the bale are now facing the front and rear of the finishing wrapper. This rotation causes the plastic film to twist and wrap from what is now one side of the bale toward the end of the bale facing the round baler.

The clamping arms, with the rotating clamps oriented in an approximately horizontal plane, are now activated to move inward and push the rotating clamps tightly onto the opposite cylindrical surfaces of the bale. After the rotating clamps are tightly gripping the cylindrical surface of the bale, the clamping arms are pivoted rearward in an arc that raises the rotating clamps to lift the bale off and clear of the table. The bale is then rotated by the rotating clamps so that the rotation pulls the plastic film onto the bale, and, as the rotation continues, it turns the bale end over end. This motion continues until the bale is fully wrapped, at which time the plastic film is conventionally cut within the round baler. During the wrapping operation the clamping arms are continuously pivoted farther toward the rear of the machine, so that, as the wrapping is completed, the arms are ready to release the bale onto the ground. The various parts of the finishing wrapper then return to their initial positions as the baler again begins its bale forming action.

The invention thereby provides a fully wrapped bale with a relatively simple structure that can be added to a conventional prior art round baler design and can be operated without additional personnel. An even more interesting aspect of the invention is that, based upon actual field tests of the invention, the entire finish wrapping procedure takes only about 20 seconds.

BRIEF DESCRIPTION OF THE DRAWINGS

FIG. 2 through FIG. 8 are schematic left rear perspective views of the finishing wrapper of the invention sequentially demonstrating the operation of the invention from the opening of the tailgate of the round baler and discharge of the bale onto the finishing wrapper through the discharge of the bale from the finishing wrapper, the restart of baler operation, and the resetting of the parts of the finishing wrapper to their starting positions.

DETAILED DESCRIPTION OF THE INVENTION

Figure 1:
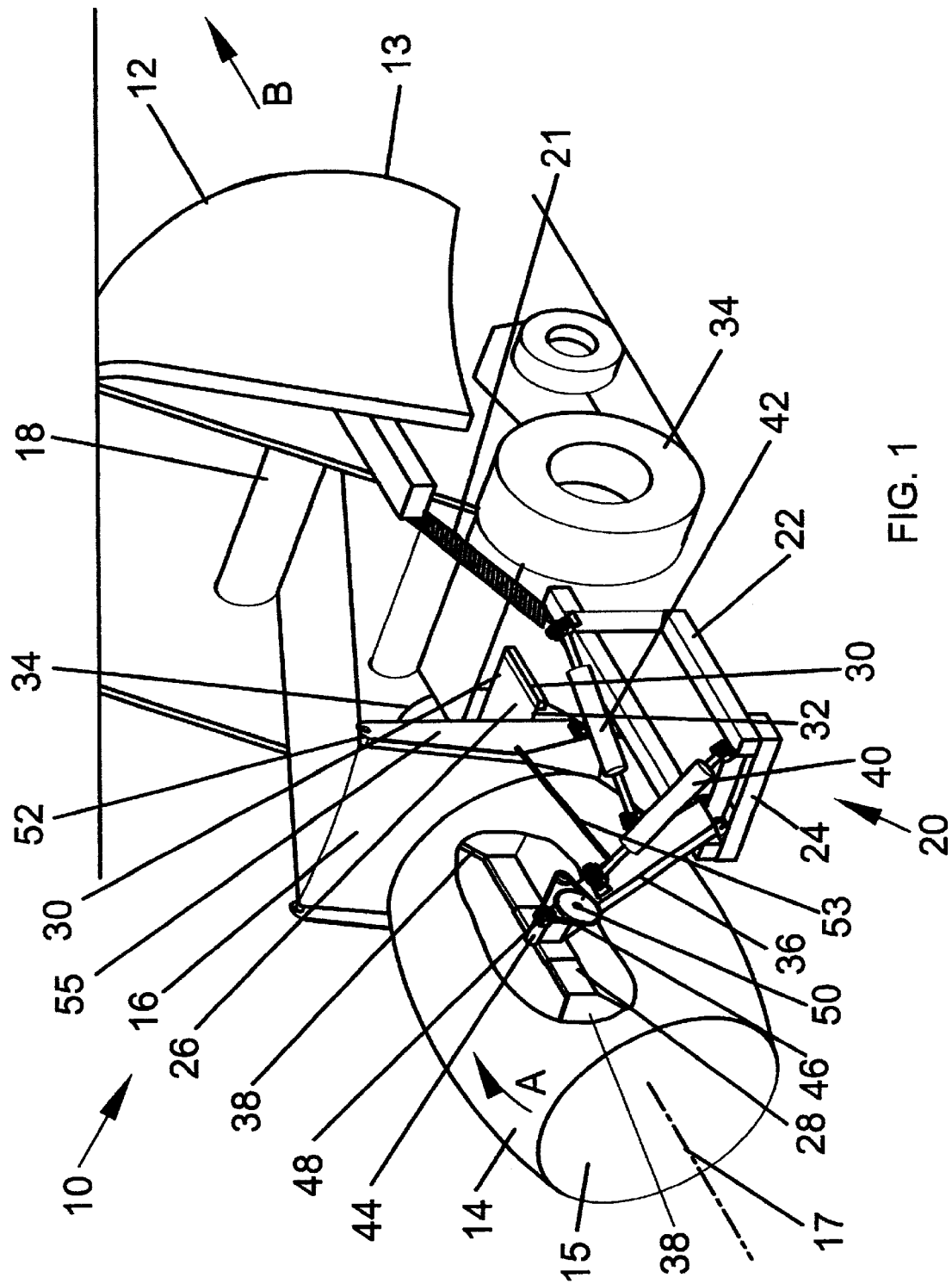
FIG. 1 is a schematic, right rear perspective view of the preferred embodiment of the finishing wrapper of the invention with the round baler to which the invention is attached shown without all its details.

FIG. 1 is a schematic, right rear perspective view of the preferred embodiment of finishing wrapper 10 with round baler 12, to which finishing wrapper 10 is attached, shown without all its details. In the following description, the term "front" is used to designate the direction toward the end of round baler 12 which has its front 13 defined based on its direction of motion indicated by the arrow "B". Similarly, the term "rear" designates the direction toward end 15 of bale 14 which is most remote from round baler 12.

Round baler 12 is a conventional machine, and is well described in the prior art. An example of this type of round baler is disclosed in U.S. Pat. No. 5,230,193 by Underhill et al. Without finishing wrapper 10 attached to the rear of round baler 12, the round baler would simply discharge round bale 14 when it is wrapped with plastic film around only its cylindrical surfaces (see FIG. 3). However, finishing wrapper 10 completes the wrapping of the bale by turning it end over end as the bale is still attached to plastic film 16 that is being dispensed off supply roll 18 within round baler 12. FIG. 1 shows bale 14 in its final stage of wrapping (also see FIG. 6) at which time cylindrical axis 17 of bale 14 is approximately aligned with the direction of motion B of round baler 12.

Finishing wrapper 10 is attached to the rear of round baler 12 by being mounted on pivoting platform frame 20 which is constructed from structural components such as arm 22 and cross member 24. Similar structural components are located on the opposite side of round baler 12, but can not be seen because they are behind bale 14. To permit platform 20 to pivot, it is attached to baler 12 only at pivot points (not shown) on the baler axle (not shown). This mounting arrangement permits platform 20 to be supported off the ground while the baler is operating and no bale is on platform 20 because springs 21 lift it up. However, when bale 14 is discharged onto "V" shaped table 26, platform 20 lowers to the ground as springs 21 extend, and cross member 24 rests on the ground. This action makes it unnecessary to include support wheels on platform 20 and reduces the original cost and simplifies maintenance of the machine.

The bale contacting parts of finishing wrapper 10 are "V" shaped table 26 and rotating clamps 28. "V" shaped table 26 is actually a simple rotating table with two high sides 30 sloping to lower center trough 32 where the two sides meet. The function of "V" shaped table 26 is first to catch bale 14 to prevent it from falling to the ground. For this purpose it is oriented across round baler 12, that is, with center trough 32 parallel to a line between large wheels 34 of baler 12. This position is shown in FIGS. 2 and 3. The second function of table 26 is to rotate with bale 14 on it so that bale 14 is turned 90 degrees, so that its cylindrical axis 17 is oriented in the direction of travel of round baler 12 and its unwrapped ends are then facing the front and the rear of finishing wrapper 10. The 90 degree rotation of table 26 is accomplished quite conventionally by using a hydraulically activated piston attached to table 26 by a linkage that causes table 26 to rotate 90 degrees when the piston changes it length. The rotation then reverses when the piston motion reverses.

Identical rotating clamps 28 on pivoting arms 36 are located on opposite sides of finishing wrapper 10 (only one of each can be seen in FIG. 1). Rotating clamps 28 perform the entire finishing wrap procedure. Once bale 14 is turned so that its unwrapped surfaces face the interior of the round baler and the rear of finishing wrapper 10, pivoting arms 36 are pivoted toward the center trough 32 of table 26, and they move rotating clamps 28 against bale 14. This action clamps fan shaped ends 38 of rotating clamps 28 tightly on bale 14, because ends 38 are oriented at an angle to rotating clamps 28 and point in toward bale 14. The inward pivoting motion of pivoting arms 36 is powered by the extension of hydraulic pistons 40 that are attached to platform frame 20 and oriented to point toward bale 14.

At the time of this initial clamping, pivoting arms 36 are oriented so that they are angled toward round baler 12 (see FIG. 4), but once the clamping is complete hydraulic pistons 42 are partially extended. Hydraulic pistons 42 are attached to pivoting arms 36 and to locations on frame 22 closer to round baler 12 than are pivoting arms 36. The extension of pistons 42 not only moves the tops of pivoting arms 36 on an arc toward the rear of finishing wrapper 10, but since rotating arms 36 were originally angled toward round baler 12, their tops were below the top of the arc, and the pivoting lifts the tops of pivoting arms 36 and rotating clamps 28 higher from table 26 than they previously were. This action, of course, also lifts bale 14 up off table 26.

It is at this point in the process, with bale 14 clear of table 26, that the turning motion of rotating clamps 28 is started. As rotating clamps 38 and bale 14 rotate in the direction indicated by arrow A, bale 14 is turned end over end and plastic film 16 is wrapped around the previously unwrapped non-cylindrical ends of bale 14. The rotation of rotating clamps 38 is accomplished by hydraulic motors 44 that drive chains 46 and sprockets 48. Sprockets 48 are on the same shafts 50 upon which rotating clamps 38 are mounted.

Spreader bar 52 serves the purpose of stretching plastic film 16 to its maximum width so that the film will completely cover and seal around bale 14. This film stretching action is important because the stretched film grips bale 14 more tightly. There are several structures that can accomplish such a spreading action, and one example is disclosed in U.S. Pat. No. 5,230,193 by Underhill et al. Therefore, that patent is incorporated herein for purposes of such disclosure. Spreader bar 52 is not shown in FIGS. 2–8 to better view other components of the invention.

It should be appreciated, that if spreader bar 52 were permanently in the position shown in FIG. 1, it would interfere with the discharge of bale 14 onto "V" shaped table 26. Therefore, cam arms 53 are attached to spreader arm supports 55 and function not only to support spreader bar 52 upright during use, but also to fold spreader arm down when it is not in use.

FIG. 2 through FIG. 8 are schematic left rear perspective views of finishing wrapper 10 of the invention sequentially demonstrating the operation of the invention from the opening of tailgate 54 of round baler 12 and discharge of bale 14 onto finishing wrapper 10 through the discharge of bale 14 from finishing wrapper 10, the restart of baler operation, and the resetting of the parts of finishing wrapper 14 to their starting positions.

FIG. 2 shows round baler 12 with tailgate 54 closed when round baler is completing the forming of the bale and the wrapping of the cylindrical surface of the bale. At this time, the components of finishing wrapper 10 are in their initial positions. "V" shaped table 26 is oriented with its center trough 32 transverse to the direction of motion B of round baler 12, pivoting arms 36 are angled forward toward round baler 12, and rotating clamps 28 are oriented in approximately a horizontal plane.

FIG. 3 depicts the apparatus after tailgate 54 has been opened and bale 14 has been discharged from round baler 12 onto finishing wrapper 10 in the direction indicated by arrow C. It should be appreciated that in FIG. 3 bale 14 is in the same orientation in which it was formed, with its cylindrical axis transverse to the direction of motion of round baler 12. With center trough 32 of "V" shaped table 26 oriented parallel to the cylindrical axis of bale 14, the surfaces of table 26 are tangent to the curve of bale 14 so table 26 catches and restrains bale 14. As previously discussed, and although not completely visible in FIG. 3, plastic film 16 that is wrapped around bale 14 is still attached to the film supply roll located within round baler 12. Furthermore, at this point in the finishing wrapping process, pivoting arms 36 and rotating clamps 28 have not been put into motion.

FIG. 4 shows the situation after bale 14 has been rotated 90 degrees, as indicated by directional arrow D, to align its cylindrical axis in the direction of motion of round baler 12. This rotation is accomplished by turning "V" shaped table 26 by the use of a conventional hydraulic piston (not shown). At this point of the sequence pivoting arms 36 and rotating clamps 28 are still in their original positions.

FIG. 5 depicts the point in the finish wrapping process after pivoting arms 36 have been moved inward to clamp rotating clamps 28 tightly against bale 14. Also, pivoting arms 36 have been pivoted away from round baler 12 in the direction indicated by arrow E, thus lifting bale 14 off of "V" shaped table 26, The actual finishing wrap is shown being applied in FIG. 6, which is the point in the process also shown in FIG. 1. As described in regard to FIG. 1, during this process bale 14 is rotated end over end by rotating clamps 28 in the direction indicated by arrow A. Plastic film 16, which at this time, is still attached to supply roll 18, thus is wrapped around the previously uncovered ends of bale 14. When this finishing wrapping is complete, plastic film 16 is cut free from supply roll 18 by conventional means (not shown) within round baler 12, and pivoting arms 36 are again pivoted in direction E toward the rear of finishing wrapper 10.

The motion of pivoting arms 36 in direction E continues until, as shown in FIG. 7, bale 14 is deposited onto ground 56 at the rear of finishing wrapper 10. Then pivoting arms are drawn away from bale 14 in the direction indicated by arrow F, and rotating clamps 28 slip out of the plastic film. Rotating clamps 28 are released from the plastic film because of the angular orientation of their fan shaped ends 38, because of the flexibility of the plastic film, and because the length of rotating clamps 28 is selected so that the plastic film covers only a portion of the ends of rotating clamps 28. As pivoting arms 36 are fully withdrawn from bale 14, tailgate 54 of round baler 12 is lowered in direction G into its closed position.

As shown in FIG. 8, as round baler 12 begins to move again in direction B to pick up crop and accumulate it into a round bale, pivoting arms 36 are moved in the direction indicated by arrow H to return them to their initial positions shown in FIG. 2. At the same time, rotating clamps 28 and "V" shaped table 26 are also reoriented to their initial positions.

FIG. 8 also shows bale 14 resting on ground 56 in an orientation that can be accomplished by finishing wrapper 10, but none of the prior art. Because of the versatility of rotating clamps 28, bale 14 can be placed with one of its non cylindrical surfaces 15 on the ground. Without finishing wrapper 10, machines such as round baler 12 always discharge their bales with their cylindrical surfaces touching the ground, and this orientation can cause significant problems because the bale can then roll away on hills.

The invention thereby provides a fully wrapped bale, and because it is mounted upon the round baler itself, it is operable without additional personnel. Furthermore, because of the simplicity of the apparatus, the invention is not only less costly and simpler to maintain than prior art, but its operation is very fast.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, "V" shaped table 26 and rotating clamps 28 can be constructed in different configurations, but still accomplish the same functions. Furthermore, although the preferred embodiment of the invention has been described in conjunction with a round bale, the bale could also be a rectangular prism, and the invention would function just as well to wrap the ends of such a bale.

What is claimed as new and for which Letters Patent of the United States are desired to be secured is:

1. A finishing wrapper apparatus to complete the wrapping of a crop bale comprising:

a support frame at the rear of a bale forming baler where a formed bale is discharged from the baler;

a supply roll mounted within the baler and supplying wrapping film with which the formed bale is partially wrapped before the bale is discharged from the baler, with the wrapping film remaining attached to the supply roll and to the bale as the bale is discharged;

a table mounted on the support frame in a location so that a bale discharged from the baler comes to rest on the table, with the table being rotatable so that the bale resting upon it is rotated from a first position when the bale is first discharged to a second position transverse to the first position;

pivoting arms attached on both sides of the support frame at a location more remote from the baler than the table, the pivoting arms being constructed so that they can pivot toward each other and pivot toward and away from the baler;

rotating clamps attached to the pivoting arms at the ends of the pivoting arms remote from the support frame, with the pivoting arms and the rotating clamps located so that when the pivoting arms are pivoted toward the baler and toward each other, the rotating clamps are clamped against both sides of the bale on the table;

first motive apparatus attached to the table to rotate the table between the first position of the bale and the second position of the bale;

second motive apparatus attached to the pivoting arms to pivot the pivoting arms toward each other to clamp the rotating clamps against the bale;

third motive apparatus attached to the pivoting arms to pivot the pivoting arms toward and away from the baler;

fourth motive apparatus attached to the rotating clamps to rotate the rotating clamps and the bale upon which they are clamped; and film cutting apparatus mounted within the baler to cut the wrapping film off the supply roll after the bale has been filly wrapped with the wrapping film.

2. The finishing wrapper apparatus of claim 1 further including a spreader bar to stretch the wrapping film to its maximum width before the wrapping film is wrapped around the bale.

3. The finishing wrapper apparatus of claim 2 further including a folding apparatus interconnected with the spreader bar to move the spreader bar out of the path of the bale being discharged from the baler.

4. The finishing wrapper apparatus of claim 1 wherein the second motive apparatus is a hydraulically operated piston.

5. The finishing wrapper apparatus of claim 1 wherein the third motive apparatus is a hydraulically operated piston.

6. The finishing wrapper apparatus of claim 1 wherein the fourth motive apparatus is a hydraulically operated motor.

* * * * *